Nov. 30, 1965 L. M. MOYROUD 3,221,301

APPARATUS FOR RECOGNITION AND RECORDING OF TEXT MATTER

Filed Oct. 12, 1960 7 Sheets-Sheet 1

*INVENTOR*

LOUIS M. MOYROUD

BY Kenway, Jenney & Hildreth

ATTORNEYS

APPARATUS FOR RECOGNITION AND RECORDING OF TEXT MATTER

Filed Oct. 12, 1960

*INVENTOR*
LOUIS M. MOYROUD
BY Kenway Jenney & Hildreth
ATTORNEYS

INVENTOR
LOUIS M. MOYROUD
BY Kenway Jenney & Hildreth
ATTORNEYS

Nov. 30, 1965 L. M. MOYROUD 3,221,301

APPARATUS FOR RECOGNITION AND RECORDING OF TEXT MATTER

Filed Oct. 12, 1960 7 Sheets-Sheet 4

INVENTOR
LOUIS M. MOYROUD
BY Kenway Jenney & Hildreth
ATTORNEYS

FIG. 9
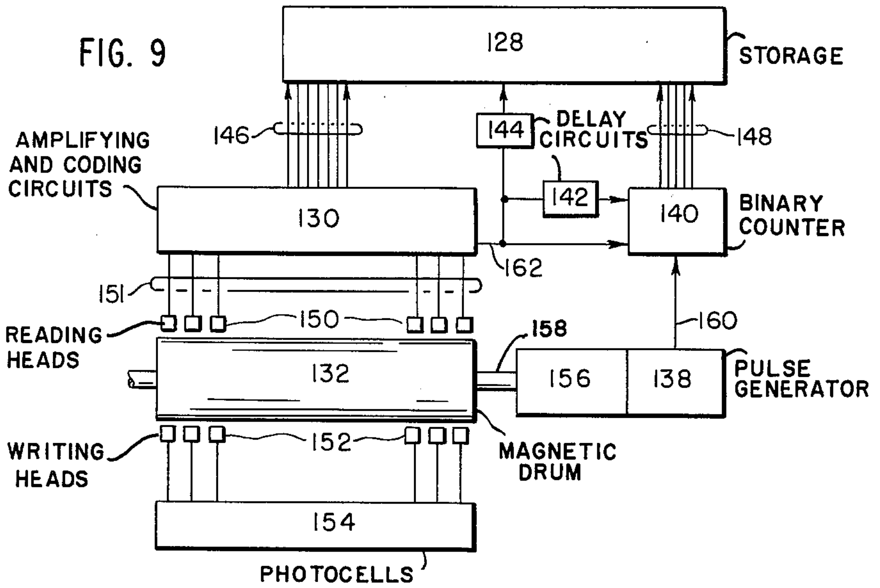
FIG. 10
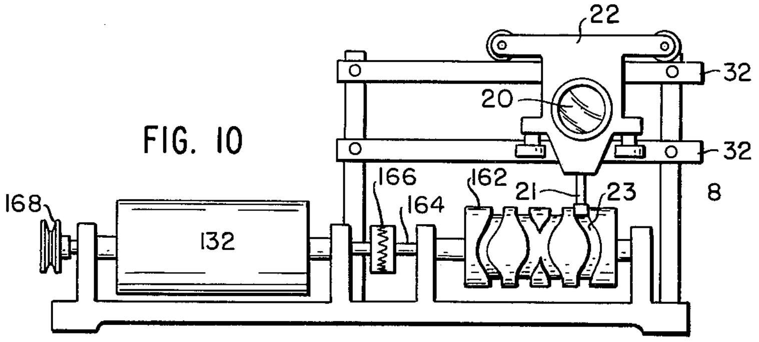
FIG. 16
TABLE I
| | Distance From O-O | Position In Line | Total | Recognition Order |
|---|---|---|---|---|
| L | 240 | 13 | 253 | 6 |
| I | 180 | 21 | 201 | 3 |
| N | 280 | 36 | 316 | 9 |
| E | 100 | 51 | 151 | 1 |
| | 540 | **66** | **606** | **13** |
| T | 400 | 78 | 478 | 11 |
| O | 300 | 92 | 392 | 10 |
| | 540 | **107** | **647** | **14** |
| B | 40 | 121 | 161 | 2 |
| E | 100 | 136 | 236 | 5 |
| | 540 | **151** | **691** | **15** |
| R | 360 | 166 | 526 | 12 |
| E | 100 | 181 | 281 | 7 |
| A | 20 | 195 | 215 | 4 |
| D | 80 | 210 | 290 | 8 |
FIG. 14
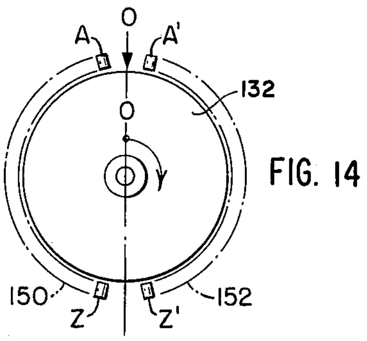
*INVENTOR*
LOUIS M. MOYROUD
*BY* Kenway Jenney & Hildreth
ATTORNEYS

APPARATUS FOR RECOGNITION AND RECORDING OF TEXT MATTER

INVENTOR
LOUIS M. MOYROUD
BY Kenway Jenney & Hildreth
ATTORNEYS

INVENTOR.
LOUIS M. MOYROUD
BY Kenway Jenney & Hildreth
ATTORNEYS

United States Patent Office 3,221,301
Patented Nov. 30, 1965

3,221,301
APPARATUS FOR RECOGNITION AND RECORDING OF TEXT MATTER

Louis M. Moyroud, West Medford, Mass. (% Graphic Arts Research Foundation, 53 Charles St., Cambridge 41, Mass.)

Filed Oct. 12, 1960, Ser. No. 62,245
Claims priority, application Great Britain, Oct. 13, 1959, 34,704/59
7 Claims. (Cl. 340—146.3)

The present invention relates in general to an image-to-code translation system, and also to an image-to-code-to-image system.

More specifically, the invention relates to a system for converting images such as printed or typewritten characters into coded information.

One object of the present invention is to provide a high speed character recognition machine.

Another object of the present invention is to provide a machine to recognize the widths of characters of variable widths, such as those used in the printing art.

Another object of the invention is to provide a system for translating characters appearing on a typewritten page into characters of variable widths and styles such as those used in the printing art.

With the foregoing and other objects in view, according to a feature of the present invention lines of characters to be coded are read one at a time by comparing to a master stencil simultaneously, one or a plurality of the characters of the line to be read.

According to another feature of the invention, the characters to be coded are simultaneously compared to positive and negative master stencils.

According to still another feature of the invention, characters not properly positioned can be identified, as well as properly aligned and spaced characters.

Other features, advantages and capabilities of the present invention will become apparent from the following description, taken in conjunction with the accompanying drawings showing certain preferred embodiments of the invention.

In the drawing:

FIG. 9 is a block diagram showing the more important components of a machine used in the recognition of characters of variable widths with means to store in coded form these various widths;

FIG. 10 shows driving means for the preferred form of the scanning mechanism;

FIG. 14 is an end view of the magnetic drum used for storing characters in coded form;

FIG. 16 is a table showing the different characteristics of the line to be read given as an example in the present description.

Figure 1:
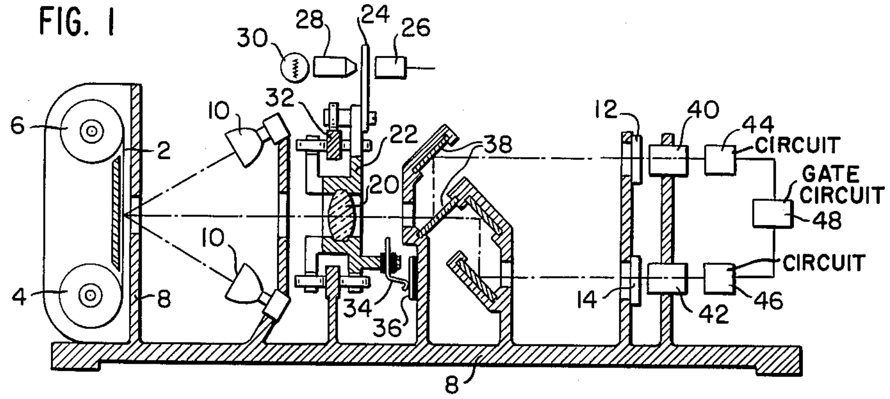
FIGS. 1 and 2 show a preferred form of the scanning mechanism of the machine.
Figure 2:
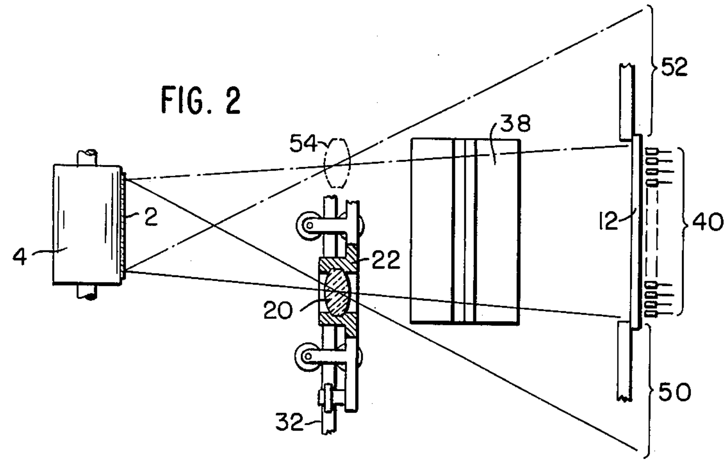
Figure 5:
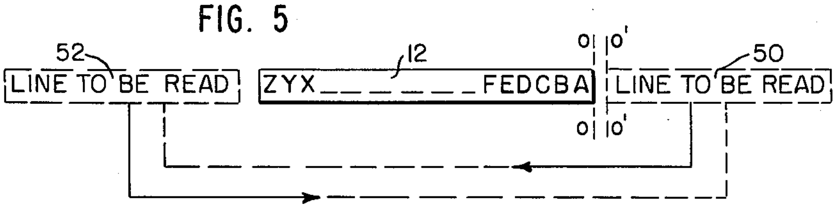
FIG. 5 is a diagrammatic view showing one of the principles embodied in the present invention.

The principle used in a preferred embodiment of the invention is shown in FIGS. 1, 2 and 5. The text to be read, preferably in typewritten form, is on the roll of paper shown at 2, the lines of text being arranged to extend across the width of the roll, the roll being intermittently moved longitudinally from line to line so that it goes from supply spool 4 to take up spool 6. An aperture of proper dimension is made in the frame 8 to enable the image of one complete line to reach a lens 20. Lamps 10 illuminate continuously the line to be read. Two images of the line are simultaneously made, namely, at stencils 12 and 14, by the use of the well known beam splitting arrangement shown at 38.

The lens 20 is mounted on a carriage 22 provided with rollers, as shown, so that it can slide on rails 32 attached to the general frame of the machine. A mechanism is provided to move the lens carriage along the rails during the translation of each line, a suitable mechanism being shown at FIG. 10. As shown in FIG. 2, the projecting lens 20 moves from the position shown to a position 54 during the scanning of each line. When it is in the position shown, it makes an image of the line to be read at 50 and when it reaches its extreme position shown at 54, the image of the line to be read has moved from the position 50 to a position 52. As shown more clearly in FIG. 5, it is evident that as the image of the line moves across the stencil 12, each character of the line to be read sweeps the whole length of said stencil. If said stencil is provided with characters of the same style as those used in the text to be read, said characters being preferably transparent on an opaque background, it is evident that each and every individual character of the line to be read will at some time during the sweeping operation be in coincidence with the corresponding character of the stencil.

One of the advantages of the present system is that the characters of the line to be read do not have to be exactly spaced in order to insure coincidence with the corresponding characters of the master stencil at some instant during the scanning operation. It is also evident that such a machine can attain high speed, particularly if a continuous scanning is made as will be explained below.

Figure 3:
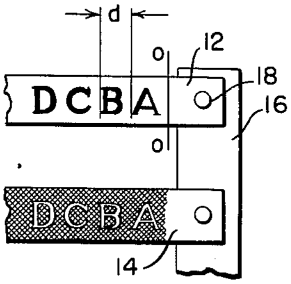
FIG. 3 shows a portion of the master stencils used to recognize the characters to be analyzed.

In the embodiment shown in FIG. 1, in order to distinguish between characters having one portion in common and differing only in a small portion, such as a period and a comma, two stencils are used as shown at 12 and 14 in FIG. 1. Stencil 12, for example, bears a series of all the characters which may have to be read, each character being opaque on a transparent background. Stencil 14 bears the same characters, but the latter are transparent on an opaque background. These characters of the master stencils can be equally spaced by a distance shown at *d* (FIG. 3). These stencils, as shown in FIG. 3, may be made of glass strips provided with holes 18 engaging positioning pins on the frame 16 of the machine, to insure easy interchangeability.

Figure 4:
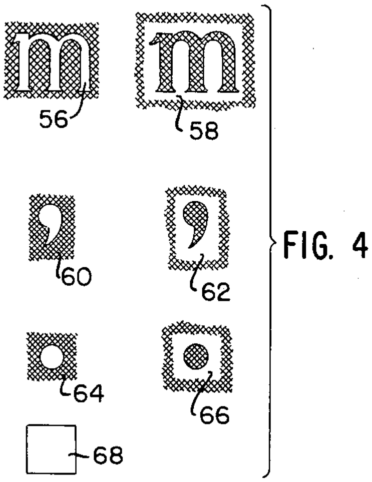
FIG. 4 shows some typical characters of the master stencils.

A separate photocell, preferably of rectangular shape, is associated with each of the characters appearing on the stencils. These photocells are generally shown at 40 and 42 in FIG. 1. An individual circuit such as 44 and 46 is associated with each photocell and a gate circuit 48 is associated with each character to be recognized. The photocells of the negative stencil 14 are associated with individual circuits 46 and adjusted in such a way that they send a signal to the circuit 48 when there is substantially a total extinction of the light going through the associated negative character stencil. On the other hand, the circuits 44 are associated with the photocells 40 and adjusted to send a signal to the circuit 48 when the light they receive is at its maximum. When the signals reach the gate 48 simultaneously, the gate through appropriate circuitry sends a signal to the storage circuit of the machine. This system, as further illustrated in FIG. 4, enables the machine to distinguish between similar or overlapping characters. For example, if we assume that the lower case m and lower case n are such that the n can be completely covered or superimposed by the m, it is evident that in order to read the n a differentiation should be made. When the n of a line to be read reaches the m of the stencil, the positive stencil will give a signal because, as shown at 58, the n will be exactly superimposed on the first part of the m; but the negative slide will not let a signal reach the gate as the leg 56 of the m will not be obturated and will allow light to reach the associated photocell. If the character lower case m were to be read, the opposite would happen as the negative stencil would give a signal of complete extinction when it reaches the n location but the positive stencil will not give a signal of maximum illumination because of the presence of the last leg of the m. The machine operates the same way for all the characters of very similar shapes such as those shown at 60, 62, 64 and 66. In the case of small characters such as the latter, it is appropriate to limit the total area used to activate the photocells to a minimum in order to make it less critical to distinguish between characters differentiated only by a small portion.

The use of positive and negative stencils is not an essential feature of this invention, and other means can be used to distinguish between similar characters such as, for example, positioning the characters on the stencil in a given order so that the characters are read in a given sequence, for example, the m before the n, the comma before the period, and so on, with means to disable the circuit associated with each character to be read as soon as it has been identified, as explained below.

Figure 6:
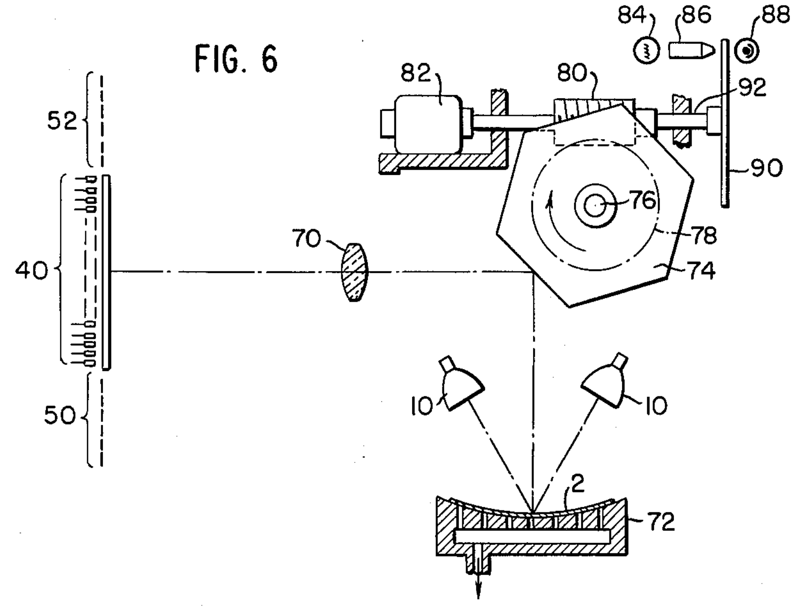
FIG. 6 shows a variant of the scanning mechanism.

The paper bearing the lines to be read is preferably provided with locating margin holes in alignment with each line in order to engage sprockets and position these lines correctly opposite the lens 20. The paper is moved by a distance corresponding to the spacing between lines after the scanning of each individual line. Alternatively, the paper may be moved continuously in a direction perpendicular to the scanning and the scanning apparatus may be operated at a higher speed so that a number of scanning operations, for example 10 or 20, may take place for the translation of each line. In the latter case, a preferred embodiment is shown in FIG. 6 in which the paper 2 is positioned on a special vacuum table or holder 72 of curved shape, provided with holes communicating with an evacuated chamber to give a concave shape to the paper, as shown. The projection of the lines to be read is made by a lens 70 and the scanning motion is obtained by the use of a multiface reflector 74 adapted for continuous rotation. This reflector is attached to a shaft 76 provided with a worm gear 78 engaged by a worm 80 integral with a shaft 92 driven by a motor 82. A disc 90 provided with transparent slits arranged in a circle is associated with a pulse generator comprising a photocell 88, an exciter lamp 84 and an optical system 86, for purposes which will be described later. In a similar fashion, the system shown in FIG. 1 is provided with a grid 24 attached to the carriage 22 and provided with transparent slits arranged in a circle in order to generate pulses by the use of an exciter lamp 30, an optical system 28 and a photocell 26. These pulses are used to time the coding operation as will be explained below.

A preferred embodiment of the sweeping mechanism is shown in FIG. 10. This mechanism comprises the carriage 22 running on rails 32 and provided with a projection lens 20. A finger 21 engages grooves 23 on a cylindrical cam 162 of the proper shape so that when shaft 164 is continuously rotating the carriage is forced to move continuously forward and backward with a short dwell period at the end of each stroke. The drum 162 can be connected through a coupling 166 to a magnetic drum 132, in the case where a magnetic drum is used, as distinguished from the stationary matrix core arrangement of FIG. 7 described hereinafter. The assembly is driven by a motor (not shown) through a pulley 168.

Figure 7:
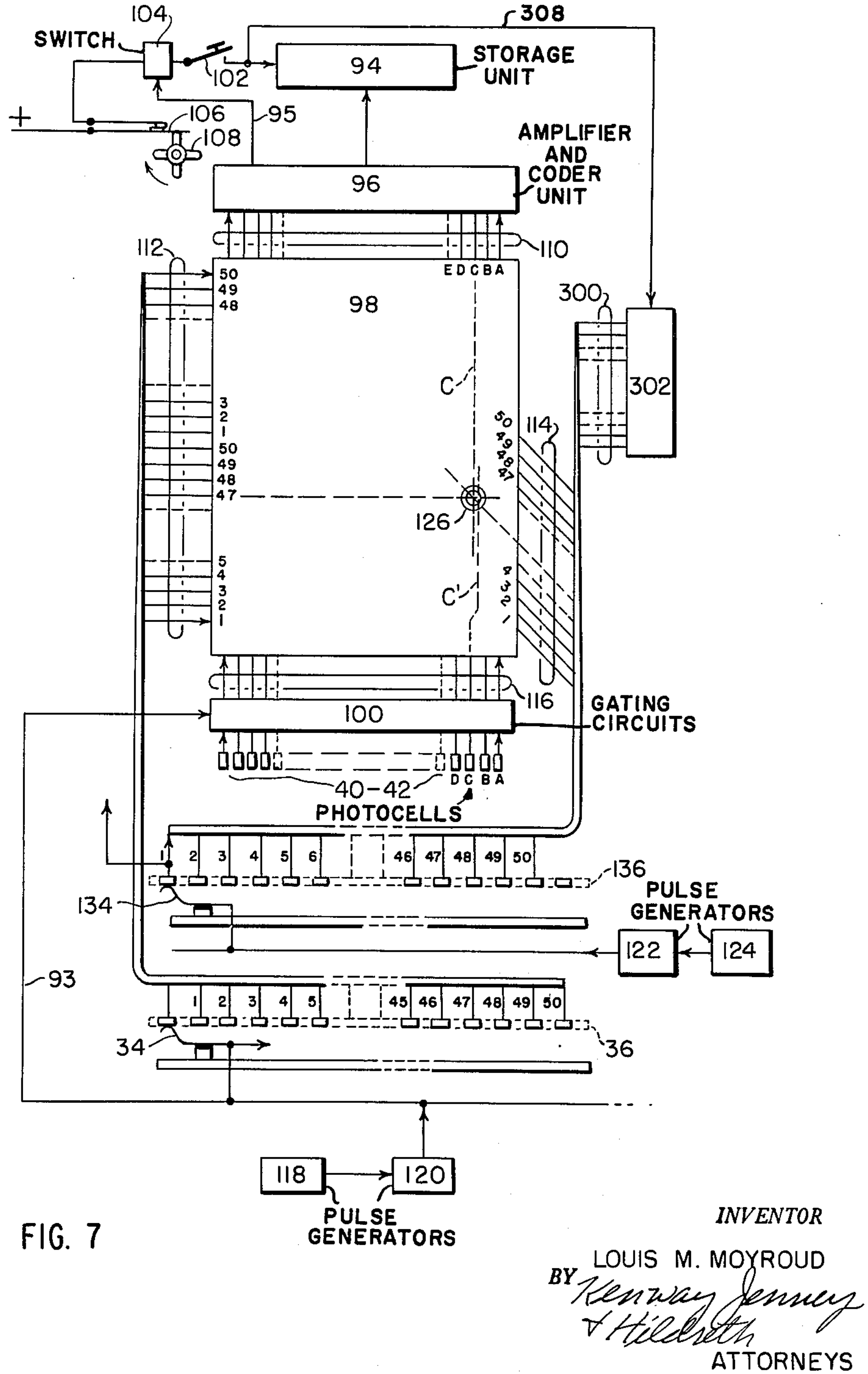
FIG. 7 is a block diagram showing the more important components of a machine used in image-to-code translation.
Figure 8:
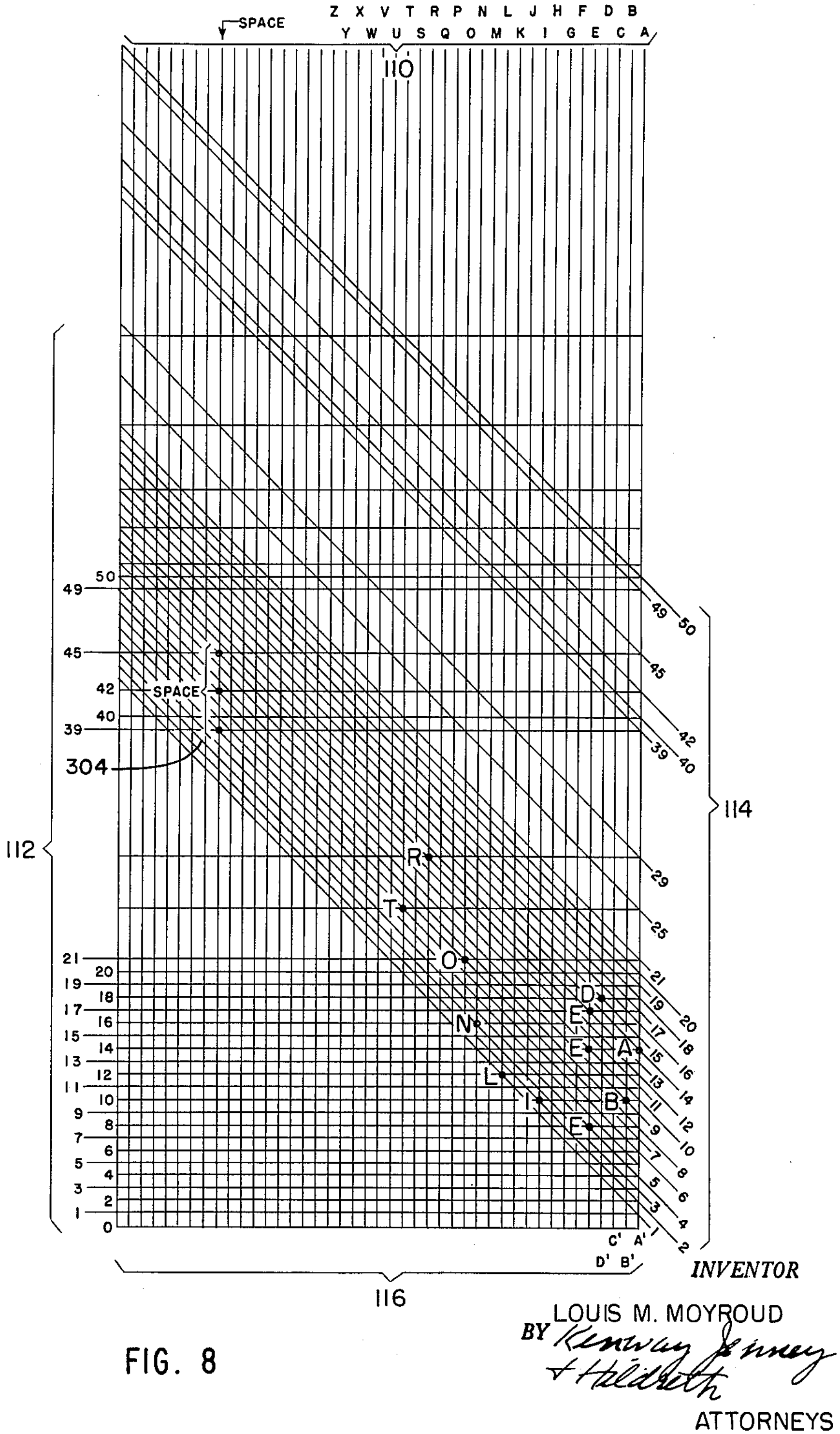
FIG. 8 shows in more detail the magnetic core matrix used in one embodiment of the invention.

The means used to translate the images identified into coded form are schematically shown in FIGS. 7 and 8, for the case of characters of equal widths, or where the characters to be read are of variable widths but these individual widths do not have to be recognized and stored. In FIG. 7, the photocells are schematically shown at 40–42 and the associated gating circuitry at 100. If the maximum number of different characters to be recognized, that is, the maximum number of different characters of the stencil, is 50, there will be a group of 50 wires shown at 116 emerging from the amplifying and gating circuitry 100 associated with the photocells. Each of these wires 116 is threaded through magnetic cores 126, there being as many vertical columns of magnetic cores as there are wires 116. In addition, each core also receives a wire of a group 112, there being the same number of the latter wires as the number of characters on the stencil plus the number in the line to be read. Each wire 112 is connected to a terminal of a plate 36 made of insulating material. A brush 34 cooperates with the plate 36. The plate 36 is preferably attached to the frame of the machine and the brush 34 is attached to the scanning mechanism such as the carriage 22 (FIG. 1). As the lens 20 moves from one extreme position to the other extreme position during the scanning of each line, the brush 34 moves from the position shown in FIG. 7 where it makes contact with a terminal 1 to the position at the extreme right where it will make contact with a terminal 50. It moves from one terminal to the next each time the projected image of the line to be read moves by the distance *d* (FIG. 3). Thus, during the displacement of the lens carriage 22 along its rails, the brush 34 will successively make contact with all the terminals of plate 36. Each core 126 can be shifted from one magnetic state to the opposite magnetic state by the coincidence, as is well known in the art, of similar pulses sent through the selected wire of the group 116 and the selected wire of the group 112. Pulses of proper shape, timing, and duration are simultaneously sent by a generator 118, 120 via a wire 93 and the opened gates of the circuit 100 to activate the selected vertical wires 116 and via the brush 34 and the terminal board 36 to activate the selected horizontal wire 112. Thus, as the carriage 22 moves along its rails, a specific magnetic core will be triggered for each coincidence, either successively or simultaneously, as it will often happen that two or more characters are simultaneously read by the machine.

For example, if the first line of the text to be recognized is "LINE TO BE READ" as shown in FIG. 5, the image of said line, as it moves to the left from position 50, will successively bring into overlapping position the characters L and A followed by L and B and A and I followed by LC, IB, NA, and so on. It can be checked from the drawing that the first coincidence will happen after the image 50 has moved a distance equal to 8 character spacings *d* if, as shown, the spacing of characters in the stencil is the same as that in the copy to be read. This first complete coincidence will store the upper case E into the storage followed by the simultaneous storage of I and B at step 10, L at step 12 and so on. FIG. 8 represents in the form of black dots those magnetic cores of the array which will have been triggered at the end of the reading of the line in FIG. 5 taken as an example. The spaces between words are represented on the stencil in the form of a square of appropriate dimension as shown at 68 in FIG. 4 and are recognized as a character except that, in this case, the negative stencil does not have to be used. There is, of course, a magnetic core at each intersection of the vertical, horizontal, and slanted lines shown in FIG. 8. There is preferably one horizontal wire 112 and one vertical wire 116 for the writing of the information corresponding to one character during the reading of the line, and one vertical wire 110 and one slanted wire 114 for each magnetic core to read the information stored in these cores and transfer said information into any appropriate form, for example, to the form of a perforated tape. To read out the information stored in the magnetic core array 98 (FIG. 7), a brush 134 and a terminal block 136 similar to brush 34 and board 36 are provided, associated with pulse generating circuitry 122, 124. The reading out of the core matrix 98 can take place simultaneously with the writing operation corresponding to the next line to be recognized because the horizontal row of the matrix which is read is always in advance by one step as shown in FIG. 7, wherein the writing brush 34 is in position zero when the reading out brush 134 is on position 1, etc. The reading out pulses are sent by a pulse generating circuit 122, 124, the brush 134 and the group of slanted wires 114. The pulses sent successively through these wires 114 are of sufficient amplitude to return to zero the cores which had been shifted to 1 during the writing operation by the simultaneous pulses sent on the wires 112 and the wires 116. As the cores which were shifted are returned to zero by the reading out pulses, they generate pulses in the wires of the group 110. These pulses are amplified and coded in a circuit 96, and sent to a storage 94 which may be in the form of a perforated paper tape or a magnetic tape. 102 represents the starting switch operating the storage unit, and 108 represents a continuously-rotating cam operating contacts 106 to move the tape in timed relation to the sweeping lens mechanism. An end-of-line code can be sent by a wire 95 to a switch 104 to stop the motion of the tape between successive lines.

In the example shown in FIG. 8 it can be seen that, as pulses are successively sent through the slanted wires 1, 2, 3, etc. of the group 114, the following character-designating vertical wires of the group 110 will receive a pulse generated by the switching of the cores shown in black on the drawing: L, I, N, E, space, T, O, space, B, E, space, R, E, A, D. The lines is thus reconstituted with the characters appearing at the input of the storage in the right sequence although they have been temporarily stored in the core matrix array in another order.

In another embodiment of the invention, the negative stencil 14 alone is used, and the beam splitting device shown at 38, FIG. 1, is omitted, the projection of the line to be read being directly obtained by the lens 20. In this case, the characters of the alphabet are not placed on the slide alphabetically as shown in FIG. 3, or at random, but according to their shape, in such a way that when two or more characters have a portion of their shape in common, the character having the largest area will be the first to be reached by the moving projection of the image of the line to be read. For example, the Q will precede the O, the W will precede the V, the m will precede the n etc. The last characters of the stencil will be the simplest, or those having the minimum "weight" or area, as for example, ; (semicolon) followed by : (colon), followed by , (comma), followed by . (period). It is evident that, in this case, the image of the O will not obturate the negative Q of the stencil because of the presence of its appendix, nor will the n obturate the m because of the extra leg. If the period is the "simplest" character of the alphabet, it will appear last on the stencil and the image of a period belonging to the line being scanned will have to move all the way along the scale without giving any pulse, as all the other characters with which it will superpose—except the last one—have a larger area through which light will pass, thus preventing the generation of a pulse through complete extinction of the light. This embodiment requires additional circuits to prevent the same character from being erroneously read again after it has been recognized. For example, as the image of an m of the scanned line moves along the slide, it will first give signal when it is in coincidence with the m of the stencil, but it will also give a signal when it reaches the n of the stencil, if we assume that the n is an exact portion of the m as could happen in unfavorable cases where an inappropriate character design is used. It can be stated from what has been explained above that, if the characters are properly arranged on the stencil, the only "exact" coincidence will be the first, all the others occurring later being caused by the superposition of the image of a character of the line to be read with a different character of the stencil having, however, a common portion with the latter. A clear example would be the successive coincidence of ; (semicolon) as it passes above the colon, comma and period of the stencil. Thus all possible "misreading" can be avoided, in this embodiment, by disabling a circuit or other means associated with each character of the line to be scanned as soon as said character has been recognized, that is to say, as soon as the first pulse due to complete extinction has been generated. This result can be achieved as described below. Referring to FIG. 8, it will be noticed that there will never be more than one particular magnetic core switched on any slanted line 114 during the "writing" operation. This is evident as each magnetic spot corresponds to a definite character of the stencil and a definite number of steps or units of displacement of the image of the scanned line across the stencil. The image of the N for example will be superposed on the A or first character of the stencil three steps after the line 0'—0' crosses line 0—0, which determines the origin of the pulse counting operation. On the other hand, assuming for simplicity that the characters of the stencil are in the alphabetical order (as shown in FIG. 5, but not as would be the case in the embodiment being described) the N occupies the 13th position following the A. Thus, the line 0'—0' will move 3 plus 13 or 16 steps before perfect coincidence is found, which corresponds to the 16th horizontal wire of the group 112 as shown in FIG. 8. If any other magnetic point were to appear on the slanted line 304, on which N is positioned, it would have to be an error (for example, due to the confusion of N and I). In order to prevent the occurrence of such errors, in addition to the arrangement of the characters of the stencil according to a selected sequence, a special disabling circuit is used, this circuit being schematically represented by block 302 in FIG. 7. There is one wire 300 for each wire 114, each one being connected to a source of current through an individual gate. When a core is switched by the simultaneous energization of one of the vertical wires 116 and one of the horizontal wires 112, a pulse is also generated, as is well known, in all the other wires threaded through the switched core. In the example given, a pulse will appear on the wire 304 (FIG. 8) at the same time as the core N is switched through the simultaneous entry of a pulse through the wire N of group 116 and wire 16 of group 112. This pulse opens a gate associated with wire 304 and connects it to an appropriate circuit in order to inhibit said wire and prevent the switching of any other core through which it is threaded. All the wires of group 114 are connected to inhibiting means in a similar manner. They are disconnected from these means by the reading out operation, through a wire 308.

Figure 11:
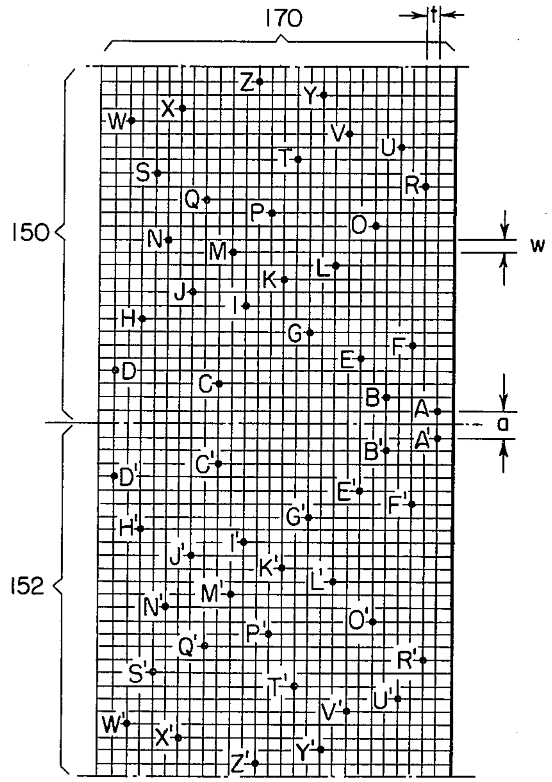
FIG. 11 represents schematically the location of the magnetic heads used in the embodiment of the invention in which characters as well as their variable widths are stored in coded form.

In the case where characters of different widths such as are commonly used in the printing art have to be coded with their individual widths the arrangement shown diagrammatically in FIG. 9 can be used. In general, characters of different widths can all be measured by an integral number of an elementary width unit which can be, for example, the 18th part of the width of a capital M. It may be appreciated that a large number of these elementary units enter into average lines of composition. As the handling of these units would require a considerably larger number of magnetic cores than in the arrangement where characters only have to be coded independently of their widths, it has been found more convenient to use a magnetic drum as intermediate storage means. Such a drum is shown at 132 in FIG. 9. The writing heads are shown at 152 and the reading heads at 150. The location of these heads on the surface of the drum is schematically shown in FIG. 11 where the developed surface of the drum is shown with the writing group of heads at 152 and the reading group at 150. There are as many heads in each group as there are characters in the alphabet of the stencil. In the example shown the stencil comprises 26 characters but it is evident that a larger number of characters will be necessary in practice so that punctuation marks, numerals, upper and lower case, etc. can be included. Each character has its own magnetic track on the drum, shown by the vertical lines 170 of FIG. 11. These magnetic tracks are separated by a distance *t*. The individual magnetic heads are separated in the direction of rotation of the drum by a distance *w* proportional to the distance by which the master characters are spaced on the stencil. In the case of the figure, as the master characters are equally spaced on the stencil, all consecutive heads are separated by a distance *w*. Each pair of reading-writing heads such as A–A′; F–F′; B′—B′; are separated by a distance proportional to the distance from line 0—0 (FIG. 3) of the corresponding master character on the stencil, plus a fixed space such as *a* necessary to leave enough space between the writing and reading heads of the first character of the stencil. In FIG. 9, block 154 represents the photocells and associated circuits of writing heads 152, the magnetic drum is at 132, the reading heads at 150, and the block 130 represents the amplifying and coding circuits to translate the pulses read by the heads 150 corresponding to a given character into any appropriate code form. In the example shown, the identity code is in the form of seven binary elements and is transferred to the storage 128 by a group of wires 146. Storage 128 is preferably in the form of a magnetic tape or, for lower speeds, in the form of a perforated paper tape. The magnetic drum 132 is connected to the sweeping mechanism 156 of the machine by a shaft 158. A pulse generator 138 is associated with the sweeping mechanism to give accurate timing pulses during the sweeping operation of the machine. One pulse is generated for each elementary displacement of the image of the line to be read on the surface of the master stencil, such displacement being preferably equal to one eighteenth of the width of the capital M of the alphabet. It is evident that the coincidence between the characters of the line to be read and the corresponding characters of the master stencil will take place at a time determined by the location of the characters of the stencil from a starting line 0—0 (FIG. 3) and by the position of the character of the line to be read, which depends on the accumulated widths of the preceding characters starting with the first character crossing line 0—0. Thus the location of the magnetized spots on the drum corresponding to the characters of the scanned line will depend on these factors, and consequently they can supply the required information not only as to the alphabetical identity of the characters to be coded but also as to their individual widths and positions in the line. The reading of these magnetic spots by the group of heads 150 will occur in the proper sequence starting with the first or last character of the line, depending on the particular projection arrangement. The particular wire of the group 151 receiving a pulse at the time of reading a magnetized spot determines the identity of the character because each of these wires 151 is associated with each head and consequently with each character of the master stencil as further explained below.

The time at which each magnetized spot is read starting either from the beginnning of the reading of the line or from the impulse of the preceding character determines the width of the recognized character. This information is obtained by sending the timing pulses emerging from the pulse generator 138 to a binary counter 140 via a wire 160. In the example shown, as the various characters of the alphabet are all expressed in units so that the widest character measures 18 units, a five stage binary counter will be necessary. In the example shown it is assumed that the reading operation of the line to be translated into coded form starts when an imaginary line 0′—0′ at the left hand side of the projection of the line to be scanned crosses line 0—0 of the stencil as shown in FIG. 5. In practice, the line 0′—0′ is represented by the first line of the grating 24 in FIG. 1 or the disc 90 in FIG. 6. As soon as this line passes the line 0—0 pulses are allowed to reach the counter 140, which receives a number of pulses corresponding to the width of the first character before the first magnetized spot reaches the group of heads 150 (FIG. 9). The reading of this magnetized spot sends a pulse over wire 162 which causes the counter to transfer its information expressed in binary form to the storage means 128 via a group of wires 148. The same pulse appearing on the wire 162, after a short delay caused by a circuit 142, resets the counter 140 to zero so that it can measure the width of the next character. The same pulse, being also delayed by an appropriate delay circuit 144, moves the storage means one step in preparation for the storage of the next character of the line. The second magnetized spot on the drum will cause a pulse to appear on the wires 151 after the counter 140 has received a number of pulses equal to the width of the second character. This information will be transferred as just explained, and the process will continue for all the characters of the line.

The magnetic drum and associated heads are schematically shown in FIG. 14. It has been assumed that the drum rotates in the direction shown by the arrow so that the "zero" mark on the magnetic drum passes all the writing heads during the first half revolution of the drum and by the reading heads during the second half revolution. In the example which is about to be described, it has been assumed that the drum 132 makes two revolutions during one sweeping action of the machine. In this case the complete writing and reading operation of a line takes place during these two revolutions. At first, the magnetic heads A′ . . . Z′ are used to write the information received by the photocell. During the next revolution the same heads are transferred to another circuit in order to erase the information which they have stored during the first revolution. The third and fourth revolutions of the drum can be idle as they take place during the return of the carriage 22, or alternatively, another line can be translated during this return motion, which necessitates a transfer circuit so that the heads corresponding to A will correspond to Z and so on; or, if preferred, a second drum can be used in conjunction with the lines read during the return of the carriage with appropriate transfer circuits.

Figure 12:
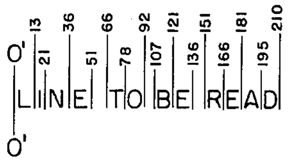
FIG. 12 illustrates a typical line given as an example in the present description.

The table I of FIG. 16 and FIG. 12 will facilitate an understanding of the operation of the machine during the reading of "LINE TO BE READ," given as example. It has been assumed that the widths of the individual characters used in the composition of this line are as follows: expressed in units: L equals 13; I equals 8; N equals 15; E equals 15; space equals 15; T equals 13; O equals 14; space equals 15; B equals 14; E equals 15; space equals 15; R equals 15; E equals 15; A equals 14; and D equals 15.

The distance in units of these individual characters from the starting line 0′—0′ is shown in FIG. 12. These distances, of course, are the accumulated widths of the various characters of the line. If we assume that the characters of the master stencil are 20 units apart, that is, the distance shown as $d$ in FIG. 3 is equal to 20 units, the table of FIG. 16 gives in its first column the distance expressed in units from line 0—0 of the various characters used in the composition of the line to be read. The sum of this distance value and of the distance from line 0′—0′ of the characters as shown in FIG. 12 represents the number of pulses which will be generated by the pulse generator, starting from the beginning of the line prior to the recognition of each character. As shown in FIG. 16, the order in which the characters of the line will be recognized does not depend exclusively on the order in which the characters appear in the line and will practically never be in this order.

In the example shown, the characters will be recognized in the following sequence, E, B, I, A, E, L, E, D, N, O, T, R, space, space, space. At the end of the transfer of the line to the magnetic drum magnetized spots will appear on its surface in the respective locations shown in FIG. 13. It can be seen that during the reading of these magnetized spots, as the drum area moves down under the reading heads 150 of FIG. 11, the reading operation will take place in the correct order, the first magnetic spot reaching its associated head being the L followed by the I followed by the N and so on. In this way, a line, read in a different order, is sent back to storage in the proper sequence. This may be understood by reference to FIG. 14 where the drum 132 (FIG. 9) is shown in its position at the instant of time when the line 0′—0′ of the line image (FIG. 5) is superimposed upon the line 0—0 of the mask. At this instant the line image 50 is moving leftwardly in relation to the fixed character mask 12 and the drum is rotating clockwise. In this position a zero mark on the drum midway between magnets A and A′, which are the reading and writing magnets, respectively, for a particular character A.

It will be evident from FIG. 5 that a certain time interval elapses between the above instant and the instant of coincidence of a character such as the A in the image with the corresponding character A on the mask. Since the rotation of the drum (FIG. 14) is synchronized with this relative character movement, we may find the spot on the drum that will be magnetized by measuring about the periphery of the drum counterclockwise from the writing head A′ a distance corresponding to the total movement of the character A in the line image from the instant shown in FIG. 14 to the instant of such coincidence. Since the reading head A is already displaced from the writing head A′ counterclockwise by a distance which corresponds to the distance of the character A on the mask from the line 0—0, depicted as "Distance From 0—0" in FIG. 16, it follows that the spot will be placed by the writing head A′ at a point displaced from the reading head counterclockwise by a distance which corresponds to the distance of the character A in the line image from the line 0′—0′, depicted as "Position in Line" in FIG. 16. It will be clear that this spot will not be produced on the drum until the moment of such coincidence. When the drum has rotated exactly one revolution to bring it back to the position depicted in FIG. 14, this spot will still not have passed under the reading head A. This first revolution is used for writing or storing all of the magnetic spots, and the next succeeding revolution will be used for sensing these spots by means of the reading heads.

Figure 13:
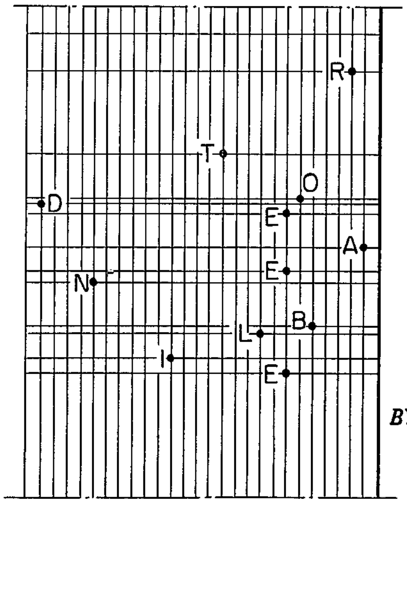
FIG. 13 shows the location of the magnetic spots on a drum resulting from the translation of the line shown in FIG. 12.

It will be evident that, at the instant when the drum begins the second revolution, all of the magnetic spots for the different characters are at the same distances from their corresponding reading magnets as the values indicated in the "Position in Line" column of FIG. 16. Therefore, the first spot to reach a reading magnet is that corresponding to the first character in the line; the second spot is that corresponding to the second character in the line; and so on. FIG. 13 is a developed view made by taking the given line of FIG. 12 and the table of FIG. 16 and measuring upwardly on a tracing sheet over FIG. 11 from each writing magnet distances corresponding to the values "Total" in FIG. 16 on the scale of one square $w$ equals ten units.

Figure 15:
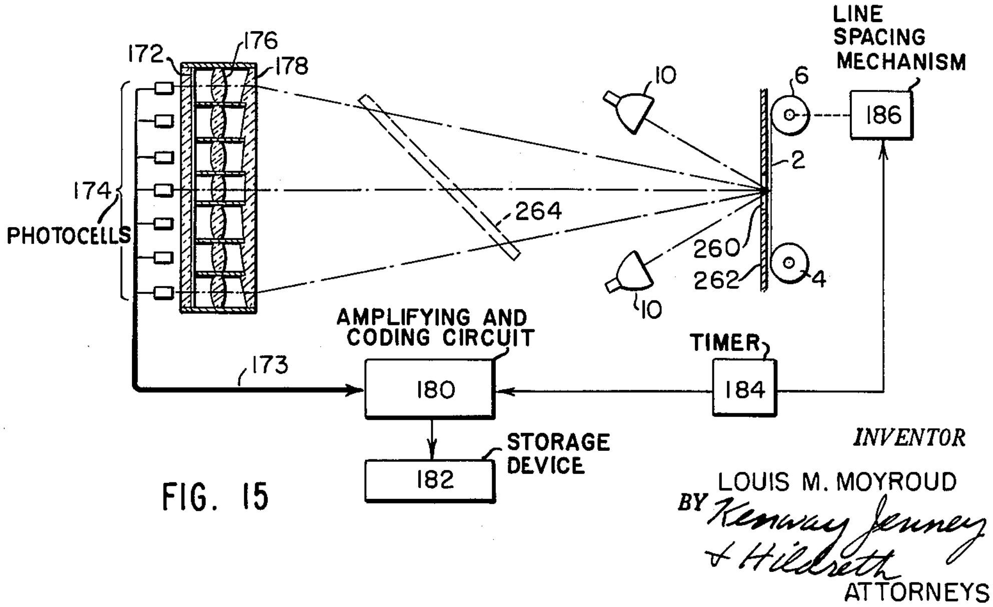
FIG. 15 shows diagrammatically an alternative form of the present invention.

FIG. 15 shows another form of the invention in which a circular stencil 172 associated with a multiplicity of small lenses 176 and a group of deflecting prisms or collecting lens 178 is used. The optical system illustrated in FIG. 15 provides a system which can project all the characters of the grid or matrix 172 at a common point. There is one photocell associated with each character as in the previously described embodiments. These photocells are generally shown at 174. The text to be read is moved by a mechanism 186 from a roller 4 to a roller 6. Lamps 10 illuminate the line to be read which appears on a paper 2. The rollers 4 and 6 are mounted on a carriage, not shown, which can move in a direction perpendicular to the plane of the figure. An opening as wide as necessary to accommodate the widest character of the line is cut into a shield 262, so that lamps 10 can illuminate the characters of the line, character by character, no more than one at a time. It is assumed in this present example that all the characters are of the same width, because the reading of characters of variable widths would necessitate additional masking mechanism. The carriage on which the text to be read is mounted can move step-by-step, one character at a time, and is returned to an initial position at the end of each line. The mechanism 186 is used to move the paper for the reading of successive lines. Each character successively illuminated and appearing at opening 260 will be projected simultaneously on all the characters of the master stencil 172 and the recognition of these characters can be made as described above by projecting simultaneously the complete array of characters not only to matrix 172, which may be negative for example, but also to a similar positive matrix by the use of a beam splitter 264. The code of the identified characters is sent via a cable 173 to a storage device 182 via an appropriate amplifying and coding circuit 180. A timer 184 coordinates the operation of the text-bearing carriage and the line spacing mechanism 186. In order to cancel the variations which may be introduced by inaccurately spaced characters it is possible to move the text-bearing carriage continuously so that each character is ready at a given time during the displacement determined by the coincidence of images and independent of the accurate spacings of the characters of the line.

Figure 17:
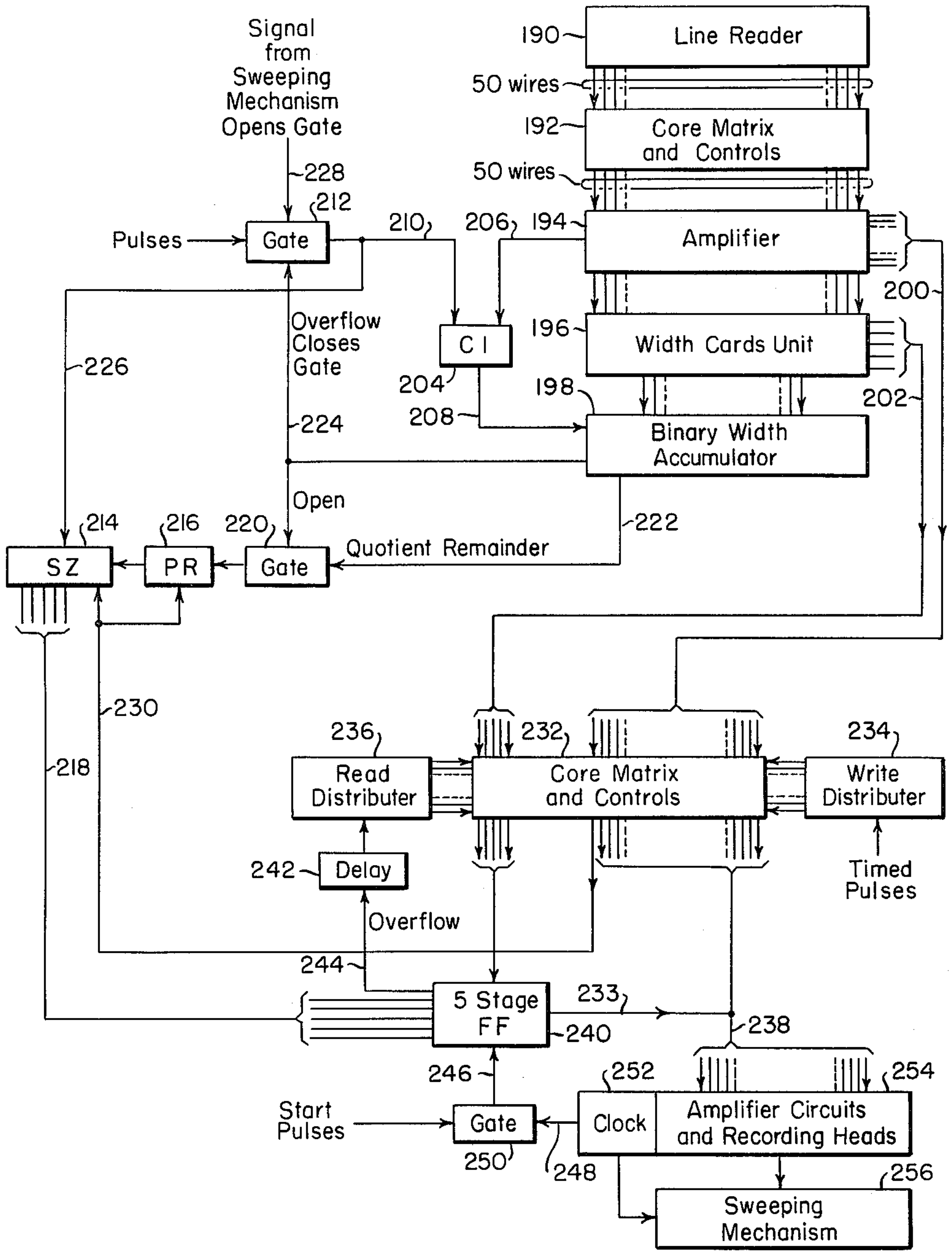
FIG. 17 represents in block diagram form an image-to-code-to-image arrangement such as can be used in a photographic type composing machine.

Although the machine described in the present invention can be used to read text printed with any kind of characters, it is preferred, in the arrangement shown in FIG. 17, to use typewritten characters especially designed to facilitate the reading operation by eliminating as much as possible any partially common shapes making the recognition more critical. FIG. 17 represents a photographic type composing machine using typewritten lines at the input rather than the standard keyboard or coded tape. The line reading mechanism is shown at 190 and comprises the scanning mechanism and related circuits. Assuming that the maximum number of different characters is 50, 50 wires emerge from the line reading mechanism to enter the core matrix and controls circuit shown at 192 for temporary storage of the character identification information read during the scanning of each line. 50 wires, one per character and interword space connect the block 192 to an amplifier 194. One group of 50 wires shown at 200 connects the output of this amplifier to the core matrix and controls 232 of the composing part of the machine. The wire 206, energized for each justifying space of the lines scanned by the reader, is connected to an interword counter CI at 204. The wires corresponding to alphabetical characters emerging from amplifier 194 are sent to a widths card unit 196 which can be of the kind described in our copending application Serial No. 741,209, filed June 9, 1958, for the purpose of giving to each of the characters read by the machine a width value depending on the particular type style to be used in the photographic type composing machine. The wires receiving the width information of the characters are shown at 202 and are also connected to the core matrix and controls 232 of the photographic section of the machine. At the same time as a width is assigned to the translated characters these widths are accumulated in a binary width accumulator 198 for purposes of justification. At the end of the scanning of each line, this width accumulator has received the accumulated widths of the characters of the line, and its deficit from full capacity represents the total amount of space to distribute between the different word spaces of the line for justification purposes. In the same manner, the total number of interword spaces has been accumulated in a counter 204 and, the justification computation can be carried out. The latter takes place at the end of the "reading" sweeping operation when a wire 228 sends a pulse to open the gate 212 allowing pulses from a pulse generator, not shown, to reach a wire 210 and thus carry out the justification computation through energized stages of the counter CI. At the same time as each pulse sent through the gate 212 reaches the binary width accumulator via CI, it is also sent to an electronic switch SZ shown at 214 via wire 226 in order to register the quotient of the division. The end of computation is reached when the binary width accumulator overflows and sends another "overflow" signal to the wire 224 to close the gate 212 and stop the justification computation. At the same time, the same pulse opens a gate 220 and allows the quotient remainder to be transmitted via a wire 222, to the quotient remainder electronic switch PR shown at 216. The justification computation can take place at any time during the reading out of a typewritten line and also, in the case where a moving lens is used, during the return of said lens to starting position. It is also possible to complete justification computation at the same time as the line is read out, and to transfer said line on to the film in the appropriate types during the return motion of the lens carriage of the reading section of the machine. The transfer of the read-out lines from the core matrix 232 on to sensitized paper or film is made as explained in our copending application Serial No. 837,043, filed August 31, 1959, now Patent No. 3,094,050. The sweeping mechanism of the photographic type composing section is shown at 256 and might include an arrangement similar to the one shown in FIGS. 1, 2, and 10. This mechanism receives the necessary information for projection of selected characters of variable widths on to the film from the matrix 232 at the appropriate time. The matrix 232 is read out by a distributor 236 controlled by a five-stage binary counter 240 through a delay circuit 242. The overflow pulse has time to reach the amplifier circuits of the character identification via 233 in order to store on the magnetic drum associated with the sweeping mechanism the alphabetical identity of the character before the read distributor 236 moves to the next row of cores. The reading out operation of the core matrix 232 is under the control of a clock circuit 252 preferably controlled by the sweeping mechanism 256. The pulses produced by the clock 252 are sent via a wire 248 to a gate 250 opened by a "start" pulse at the beginning of the reading out operation and via a wire 246 to the binary counter

240. Each time a justifying space is read by the read out distributor 236 a pulse appears on wire 230 which is sent to switches PR and SZ in order to transfer, to the appropriate wires 218 of the input cable 218, the widths corresponding to the justified spaces as explained in said applications. The "write-in" distributor 234 can be controlled by any appropriate means and is preferably timed by the "reading" section of the machine.

It will be understood that while the invention has been described with reference to certain preferred embodiments thereof, various modifications of design and alternative arrangements may be employed by utilizing the skills familiar to this art, without departing from the spirit or scope of this invention.

What is claimed is:

1. Apparatus for recognizing and recording information corresponding to text matter having, in combination, a support for a sheet having thereon a line of text matter, means to illuminate the entire line, optical means to form an image of said line, a support having an array of duplicates of the characters for recognition arranged in consecutive order, means for causing said line image to translate continuously in the direction of its length relative to the duplicates, thereby causing each character image therein to pass over each and every duplicate successively, said duplicates being disposed in position to coincide with the image of each corresponding character in said line at some instant during said translation, means associated with each duplicate and operative at said instant to produce a recognition signal, and a recorder for recording each said signal at the instant thereof during said continuous translation.

2. The combination according to claim 1, wherein said optical means is adapted to form a pair of images of the line, and including a first array of positive duplicates and a second array of negative duplicates, one of said line images being positioned to pass over each array, the recorder producing a recognition signal at each instant when one duplicate is obturated by a character image while its corresponding duplicate has a part thereof underlying every part of the corresponding character image.

3. The combination according to claim 1, wherein said optical means is adapted to form a pair of images of the line, and including a first array of positive duplicates and a second array of negative duplicates, one of said line images being positioned to pass over each array, the recorder including photoelectric means for each array adapted to produce a recognition signal at each instant of substantial obturation of light by a character image passing over one duplicate while a maximum light flux passes through a region surrounding a corresponding duplicate having a part thereof underlying every part of the overlying character image.

4. The combination according to claim 1, in which the recorder has a field of discrete memory elements arranged in a pair of coordinates, respectively corresponding to the different characters for recognition and the order of occurrence of recognition signals in one translation of the line image relative to all of the duplicates.

5. The combination according to claim 1, in which the recorder is a magnetic drum having a plurality of annular memory paths thereon each corresponding to a character for recognition, each path having a recording head and a reading head.

6. The combination according to claim 1, in which the recorder is a memory device with a pair of coordinates respectively corresponding to the different characters for recognition and the order of occurrence of recognition signals in one translation of the line image relative to all of the duplicates, said memory device having a reader adapted to read the recorded signals in the order in which the corresponding characters appear in the line.

7. The combination according to claim 1, in which the recorder is a memory device with a pair of coordinates respectively corresponding to the different characters for recognition and the order of occurrence of recognition signals in one translation of the line image relative to all of the duplicates, said memory device having a reader adapted to read the recorded signals in the order in which the corresponding characters appear in the line, said memory device also having circuit connections along diagonals between said coordinates and means operative after the first recording on a point in each circuit to inhibit further recording on any point in said circuit.

References Cited by the Examiner

UNITED STATES PATENTS

| | | | |
|---|---|---|---|
| 2,692,551 | 10/1954 | Potter | 340—149 |
| 2,769,922 | 11/1956 | Peery | 250—219 |
| 2,919,425 | 12/1959 | Ress et al. | 340—146.3 |
| 2,927,216 | 3/1960 | Lohninger | 250—217 |
| 3,085,227 | 4/1963 | Brown | 340—146.3 |

MALCOLM A. MORRISON, *Primary Examiner.*

IRVING L. SRAGOW, *Examiner.*